United States Patent [19]

Erhage

[11] Patent Number: 5,633,643
[45] Date of Patent: May 27, 1997

[54] METHOD AND DEVICE FOR SIGNAL-PROCESSING IN A RADAR SYSTEM

[75] Inventor: Lars I. Erhage, Göteborg, Sweden

[73] Assignee: Telefonaktiebolaget LM Ericsson, Stockholm, Sweden

[21] Appl. No.: 600,502

[22] Filed: Feb. 13, 1996

[30] Foreign Application Priority Data

Feb. 14, 1995 [SE] Sweden .................. 9500516

[51] Int. Cl.$^6$ ........................................ G01S 7/28
[52] U.S. Cl. ............................ 342/159; 342/127
[58] Field of Search ..................... 342/159, 127, 342/175, 160, 161, 162

[56] References Cited

U.S. PATENT DOCUMENTS 4,709,237  11/1987  Poullain et al. .................. 342/203
5,483,962  1/1996   Shiba .......................... 128/660.05

*Primary Examiner*—Daniel T. Pihulic
*Attorney, Agent, or Firm*—Burns, Doane, Swecker & Mathis, L.L.P.

[57] ABSTRACT

Method and device for reducing, in a radar system, the influence of distortion which has arisen in signals in signal-generating and signal-processing parts of the radar system by firstly applying a first random phase rotation to a signal before a first signal-processing. After the first signal-processing, the signal is phase-rotated with a second phase rotation which has the same phase rotation value as, but the opposite sign to, the first phase rotation. Thereafter, a transmission pulse, created from the signal, is emitted from the radar system and is reflected off targets or objects and is received by the radar system. A third random phase rotation with a second phase rotation value is applied to the received signal before a second signal-processing. After the second signal-processing, the received signal is phase-rotated with a fourth phase rotation which has the same phase rotation value as, but the opposite sign to, the third phase rotation. The result of this is that all distortion products and external interferences which have arisen in the signal-processing paths of the signal will have a random remaining phase rotation, as a result of which these will appear as random noise and can therefore be separated from the useful signals.

18 Claims, 2 Drawing Sheets

METHOD AND DEVICE FOR SIGNAL-PROCESSING IN A RADAR SYSTEM

BACKGROUND

The present invention relates to a method and a device for reducing the influence of distortion which is created during frequency-generating and/or signal-processing in a Doppler radar system.

When an electrical signal is to be processed in a system, it is often a requirement that the signal-processing should be as free as possible from distortion. There are many different types of distortion which can occur when an electrical signal is being processed, among which there may be mentioned non-linear distortion, such as overtone formation and intermodulation, and in addition additive distortion, such as additive tones, in most cases caused by crosstalk. The effect of these different types of distortion is that distortion products of the overtone type and intermodulation products arise. Some examples of signal-processing are analog/digital conversion, amplification and frequency conversion. Non-linearities in individual components included in a system add up, and the demands placed on the components included in large systems are therefore stringent in order to make it possible to keep the total distortion through the whole system as low as possible.

Among the problems which may arise as a result of distortion, are false echoes in radar systems, also called ghost echoes. These can occur, for example, in an airborne radar system where echoes are received from the ground at the same time as echoes from aircraft. As a result of the distortion products which occur in signal-processing and frequency-generating, the ground echo gives rise not only to larger and real echoes, but also to a number of small, false echoes. This in turn has the effect that small but real echoes from aircraft cannot always be detected since a relatively high detection threshold is normally used in order to filter out the small, false echoes which have arisen on account of distortion in the radar system. Unless a higher detection threshold is used, it is not possible for the operator, or for further signal-processing, to distinguish between small but real echoes and false echoes. This in turn can lead to even greater problems for the operator.

U.S. Pat. No. 4,709,237 describes a device for eliminating low-frequency thermal noise which has arisen in transmitter amplifiers and receiver amplifiers of a radar. Unfortunately, the device does not solve the problems of the distortion which occurs in signal-generating and signal-processing means in which non-linearities, inter alia, cause overtones.

SUMMARY

Since it is not possible to permit valuable information to be lost through filtering, especially filtering which is prompted by the fact that the system itself has distorted and garbled the signal, the present invention discloses a method and a device which make it possible to avoid this.

One object of the present invention is therefore to specify a method and a device which reduce the problems and the influence of the distortion which is created during at least either one of frequency-generating or signal-processing in a Doppler radar system.

Another object of the present invention is to specify a method and a device by means of which it is possible to lessen the demands which are made in respect of the undesired non-linearity of the components included in large systems where there are stringent demands placed on low distortion.

A further object of the present invention is to specify a method and a device by means of which it is possible to lower the detection threshold in a radar system in order to be able, in this way, to detect small but nevertheless real target echoes.

Said objects are achieved, according to the present invention, by means of applying to the signal, upon each transmission pulse, a new phase rotation, which is determined randomly for example, before the first signal-processing of the signal, and thereafter rotating the signal back by the same random phase rotation value after the last signal-processing of the signal. The result of this is that all distortion products and external interferences which have arisen in the signal-processing paths of the signal will have a random remaining phase rotation. It is a considerable advantage that the distortion and the interferences have a remaining phase rotation, especially a random one, since the distortion and the interferences will in this way appear as random noise. If the distortion and the interferences occur as a random noise, they will not compete with the useful signals, that is to say the valuable information, due to the fact that the energy content of individual distortion products and interferences is distributed over a wide frequency range. This advantage is further reinforced in systems which add up useful signals, for example in a Doppler radar system, where it is then possible to threshold out these distortion products and interferences in a simple manner using a relatively low detection threshold.

BRIEF DESCRIPTION OF THE DRAWINGS

The invention will be described in greater detail hereinbelow, in an illustrative and in no way restrictive manner, and with reference to the attached drawings, in which.

DETAILED DESCRIPTION

In order to facilitate understanding of the function of the invention, a radar system according to the prior art will be described by way of introduction, with reference being made to FIG. 1 which shows an example of a system in which the present invention is applicable. This radar system is described in brief in order to explain the basic function of a complicated system of this kind.

In order for a pulse Doppler radar system to function, transmission pulses are generated. The transmission pulses are sent out and are reflected off objects or structures and back to the radar system. When the radar system has received these reflected transmission pulses, that is to say echoes, the information is processed, and the results are finally displayed in one form or another, and these results can be, for example, the distance, speed and/or position of the target object.

Figure 1:
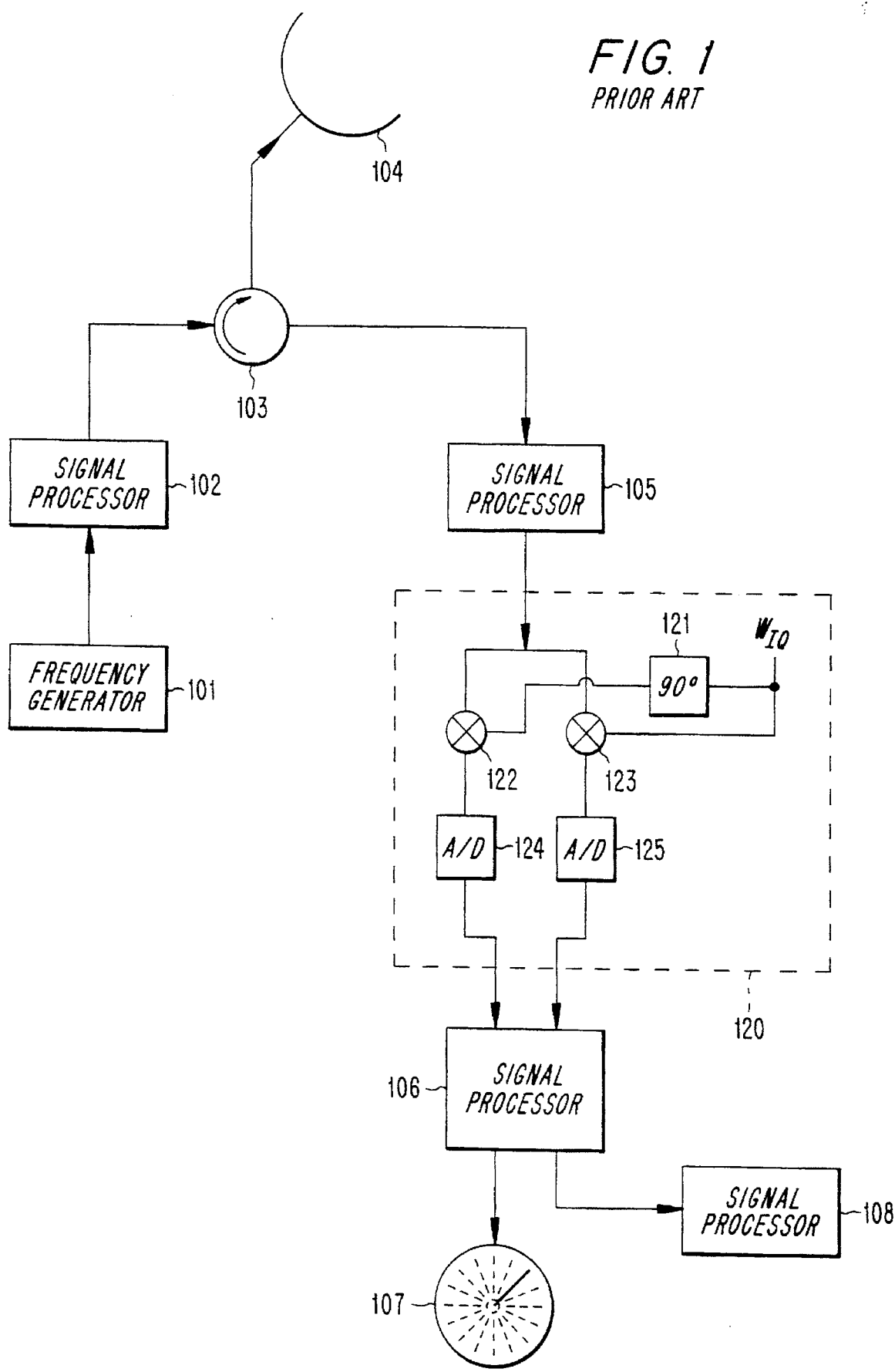
FIG. 1 illustrates signal-processing paths in a radar system according to the prior art.

These transmission pulses are generated, according to FIG. 1, with the aid of a frequency-generating device 101 which produces a reference signal having the fundamental frequency which the transmission pulses consist of. This signal is then amplified and modulated in the signal-processing device 102 in order to produce the transmission pulses. If a common antenna is used for transmitting and receiving, the transmission pulses are then conveyed to a transmitter/receiver switch 103 and are then oriented, with the aid of an antenna 104, in the desired transmission direction. The antenna 104 can of course consist of an electrically or mechanically controllable antenna or a fixed antenna, depending on the application.

When the emitted transmission pulse has been reflected off an object, it returns and is received by the antenna 104. It is conveyed onwards, via the transmitter/receiver switch 103, to a signal-processing device 105 where, for example, frequency conversion (demodulation), filtering and amplification of the signal are carried out. Since additional signal-processing is preferably carried out completely digitally, A/D conversion takes place in a block 120 where division of the signal into two quadrature components I and Q is first carried out by dividing the signal into two branches and then mixing the signal in mixers 122 and 123 with two signals having a relative phase difference of 90°. The phase rotation of 90° is effected with the aid of a phase-rotating device 121. The two quadrature signals I and Q are then each A/D converted in their respective A/D converters 124 and 125.

Detection, thresholding and, if appropriate, further calculations are carried out in a signal-processing device 106, after which the result is displayed on a visual display device 107 and/or transferred to a processor 108 for further processing.

Figure 2:
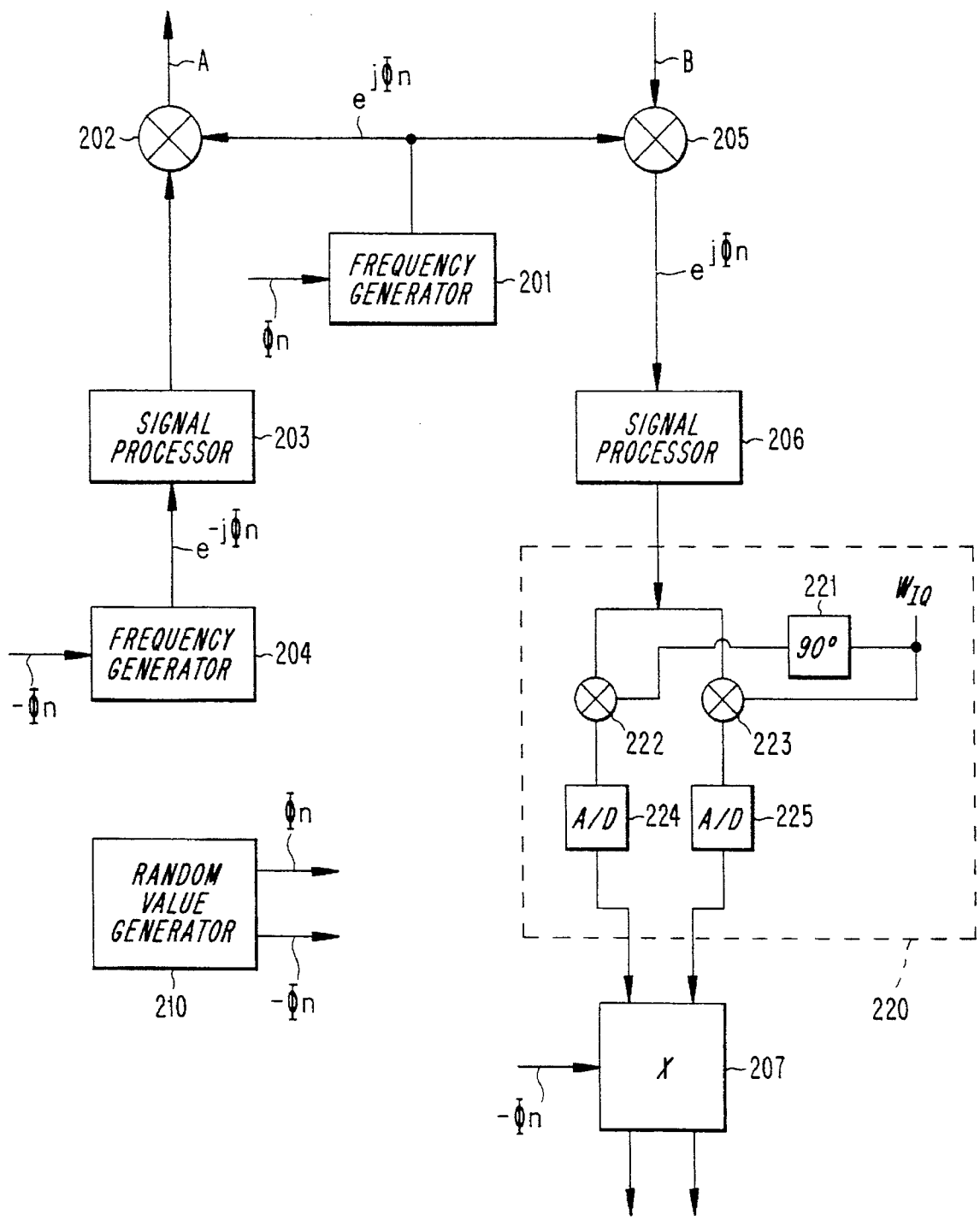
FIG. 2 illustrates an example according to the present invention applied to signal-processing paths in a radar system.

In order to explain the method and the device according to the present invention, an example of its application will be described hereinbelow, with reference to FIG. 2.

The invention comprises a random-value-generating device 210 which, immediately before a transmission pulse is to be generated, generates new random phase rotation values $\Phi_n$ and $-\Phi_n$, where n=0, 1, 2, 3, . . . . These phase rotation values are supplied to a phase-rotating and frequency-generating device 204 which generates a signal in which the phase of the generated signal has been rotated by the angle $-\Phi_n$ in relation to the reference signal of the system, also generated in the frequency-generating device 204, but not shown.

The signal, that is to say the future transmission pulse, is processed in a signal-processing device 203, which can, for example, involve frequency conversion, filtering and amplification, and is finally converted in a mixer 202 with a signal generated by a phase-rotating and frequency-generating device 201. The phase rotation in the phase-rotating and frequency-generating device 201 has the same value as, but opposite sign to, the phase rotation applied in the phase-rotating and frequency-generating device 204, the conversion in the mixer 202 resulting in a transmission signal A whose useful part has a phase position which is independent of $\Phi_n$. The useful part of the transmission pulse means the desired pure transmission pulse without distortion products.

Transmission pulses whose useful part has a phase position which is independent of $\Phi_n$ are required because the time between the emitted pulses in radar systems with a high pulse repetition frequency (PRF) is less than the delay time interval of the transmission pulses for conceivable echoes (in radar terms "several times round the echo"), for which reason a "disorder" of emitted radar pulses occurs when they are received. If the phase positions (the useful part) of the transmission pulses were dependent on $\Phi_n$, it would not be possible to tell, at a high PRF, which echoes were phase-rotated by which $\Phi_n$.

Before the transmission signal A leaves the radar as a transmission pulse, it has to be pulsed, amplified, and also oriented in the desired direction with the aid of an antenna.

The echo signal which is reflected off the target object is usually received via the same antenna, for example according to FIG. 1, and the signal is amplified preferably before the received signal B is frequency-converted in a mixer 205.

The echo signal B which has been received from the target object is mixed in the mixer 205 with the signal generated in the phase-rotating and frequency-generating device 201, the received signal being phase-rotated by the angle $\Phi_n$ and frequency-converted.

The signal is then processed in the signal-processing device 206, which can, for example, involve frequency conversion, filtering and/or amplification. A/D conversion is then carried out in the block 220 where division of the signal into two quadrature components I and Q is effected by dividing the signal into two branches and then mixing the signal in mixers 222 and 223 with two signals having a relative phase difference of 90°. The phase rotation of 90° is effected with the aid of a phase-rotating device 221. The two quadrature signals I and Q are each A/D converted in their respective A/D converters 224 and 225. Finally, the signals are phase-rotated through the angle $-\Phi_n$ by a phase-rotating device 207 in order to restore the phase rotation of the received signal which was applied earlier in the receiving chain.

Immediately before a new transmission pulse is to be generated, new phase rotation values $\Phi_{n+1}$ and $-\Phi_{n+1}$ are produced, controlled by a random-value-generating device 210, and the procedure is repeated with this new phase rotation value.

During signal-processing in devices 203 and 206, mixing 222, 223, and A/D conversion 224 and 225, distortion is created as a result of the occurrence of overtones, intermodulation and leakage from nearby signals, which in this way distort the useful signal. The nature of overtones and intermodulation means that the phase rotation of an overtone or an intermodulation product becomes a multiple of the phase rotation of the signal which is being processed. As regards leakage of signals, these will not be affected by the phase rotation of the useful signal since these leakage signals are only added to the useful signal.

This means that distortion generated in the signal-processing device 203, and of the above-mentioned nature, will include, after mixing in the mixer 202, a phase rotation of $\Phi_n$ for leakage signals and of $(N-1)^*\Phi_n$ for overtones. The letter N stands for the order of overtone (for example, second and third tone).

The course of events which has been described can be illustrated by the following simple examples. A first example shows the course of events when use is made of a signal which consists only of one tone of frequency $\omega$. This signal can be illustrated by:

$$e^{j\omega t}$$

The phase rotation $\Phi_n$ which is to be applied to the useful signal can be illustrated by the following expression:

$$e^{j\Phi_n}$$

where it is important to note that $\Phi_n$ does not vary with time, but is a value which, usually, only changes from transmission pulse to transmission pulse. When this phase rotation has been applied to the signal, an expression is obtained which can be represented as:

$e^{j(\omega t + \Phi_n)}$

When this phase-rotated signal is processed in different types of signal-processing means, the distortion which has arisen in some components will give rise to different frequency combinations of ω, which can be written as a sum:

$\sum_N a_N \cdot e^{jN(\omega t + \Phi_n)}$ where $N=0, \pm 1, \pm 2, \ldots$ and $a_N$ is the signal amplitude of component N. After all the signal-processing, but before the finished transmission pulse is emitted from the radar station, a further phase rotation which is written:

$e^{-j\Phi_n}$ must be applied to the signal. This second phase rotation has the same value as the first phase rotation, but the opposite sign. This gives:

$\sum_N a_N \cdot e^{j<N\omega t + (N-1)\Phi_n>}$

A remaining phase rotation is thus obtained except where N=1. That is to say that all frequency components which are different from the tone with the frequency ω (N=1) will have a phase rotation equal to $(N-1)\Phi_n$.

The course of events which has been described will now be explained using another simple example which shows the course of events when use is made of a signal consisting of two tones with the frequencies $\omega_1$ and $\omega_2$, respectively. This signal can be illustrated by:

$e^{j\omega_1 t} + e^{j\omega_2 t}$

The signal is to be phase-rotated by $\Phi_n$ which can be written as:

$e^{j\Phi_n}$

When this phase rotation has been applied to the signal, the latter can be described as:

$e^{j(\omega_1 t + \Phi_n)} + e^{j(\omega_2 t + \Phi_n)}$

Distortion in components, for example during signal-processing, gives rise to different frequency combinations of $\omega_1$ and $\omega_2$, and this can be written as:

$\sum_{M,N} a_{M,N} \cdot e^{j<N(\omega_1 t + \Phi_n) + M(\omega_2 t + \Phi_n)>}$ where $M=0, \pm 1, \pm 2, \ldots$ and $N=0, \pm 1, \pm 2, \ldots$ and $a_{M,N}$ is the signal amplitude of component M,N.

In order to restore the phase of the useful signal after the signal has been processed, a further phase rotation is applied with:

$e^{-j\Phi_n}$ which finally gives:

$\sum_{M,N} a_{M,N} \cdot e^{j<N\omega_1 t + M\omega_2 t + (M+N-1)\Phi_n>}$

Thus, a remaining phase rotation is also obtained here, except where M+N=1, that is to say, inter alia, for M=1, N=0 and M=0, N=1.

As will be clear from these two examples, distortion products will have a remaining phase rotation after the last phase rotation. If then $\Phi_n$ varies, for example, randomly from transmission pulse to transmission pulse, these distortion products will appear as random noise.

On the receiving side, distortion of the same character can arise in the signal-processing device 206, mixers 222 and 223 and A/D converters 224 and 225. After phase rotation in the phase-rotating device 207, the distortion will have a remaining phase rotation, for the same reason as in the transmission branch.

Subsequent signal processing in a Doppler radar is usually carried out over a large number of emitted radar pulses by means of measuring the amplitude of the received signal at a given point in time after each emitted radar pulse ("range gate") and filtering these with the aid of a set of narrow filters (Doppler filter bank). Identical signal-processing operations, though for different time delays, are carried out in parallel in order to provide the radar with coverage of targets at different distances. Since the distortion has a remaining phase rotation which changes from pulse to pulse in a random manner, this means that the distortion will appear as random noise. In the context of radar, this is preferable since the distortion will be distributed across the whole set of filters and does not therefore compete to the same extent with a target echo which is concentrated in one filter.

It is not a requirement that the phase rotations vary completely randomly from transmission pulse to transmission pulse. For example, the values $\Phi_n$ can be established in accordance with the formula $\Phi_n = \Phi_o * n^2$, where $\Phi_o$ is a low initial value for the phase rotation, and n is increased by the value of one for each new transmission pulse. It is also conceivable, for example, to carry out the phase modulation by means of so-called table look-up with the aid of a read only memory, a so-called PROM, instead of using the method which has been described above.

The invention is not limited to the preferred embodiment which has been described above, but can be modified in various ways within the scope of the claims which follow.

What is claimed is:

1. A method for reducing, in a radar system, the influence of distortion, which has arisen in signals, in signal-generating and signal-processing parts of the radar system, comprising the steps of:

(a) applying a first phase rotation with a first phase rotation value to a first signal before a first signal-processing, as a result of which a second signal is formed;

(b) processing said second signal in said first signal-processing, as a result of which a third signal is created;

(c) phase-rotating said third signal with a second phase rotation which has the same value as said first phase rotation but the opposite sign, as a result of which a fourth signal is formed;

(d) emitting a transmission pulse, created by said fourth signal, reflecting said transmission pulse off targets or objects and receiving said transmission pulse by said radar system in the form of a fifth signal;

(e) applying a third phase rotation with a second phase rotation value to said fifth signal before a second signal-processing, as a result of which a sixth signal is formed;

(f) processing said sixth signal in said second signal-processing, as a result of which a seventh signal is created; and (g) phase-rotating said seventh signal with a fourth phase rotation which has the same value as said third phase rotation, but the opposite sign.

2. The method of claim 1, wherein said first and second phase rotation values change over time.

3. The method of claim 2, wherein said change of the phase rotation values takes place upon each new radar pulse.

4. The method of claim 3, wherein said first and second phase rotation values are determined by a random value generator.

5. The method of claim 3, wherein said first and second phase rotation values are calculated from a formula.

6. The method of claim 3, wherein said first and second phase rotation values are determined in accordance with a pattern which is pre-defined in a table.

7. The method of claim 1, wherein the radar system is a Doppler radar system.

8. The method of claim 7, wherein said first and second phase rotation values are identical.

9. The method of claim 8, wherein said radar system has a high pulse repetition frequency (PRF) where the time between the emitted pulses is less than the delay time interval of the pulses for conceivable echoes.

10. A device for reducing, in a radar system, the influence of distortion which has arisen in signals in signal-generating and signal-processing parts of the radar system, the radar system comprising signal-generating, amplification, modulation, demodulation and signal-processing means which are designed to generate transmission pulses intended to be emitted via an antenna towards objects in order to be reflected off these objects and received via an antenna, amplified, demodulated and signal-processed in order to be able to determine in this way at least one of the distance, speed and position of the target object, said device comprising:

first phase rotating means designed to phase-rotate a first signal by a first phase rotation value and thereby create a second signal which is supplied to first signal-processing means designed to process said second signal, as a result of which a third signal is created;

second phase rotating means designed to phase-rotate said third signal by the same value by which said first phase rotating means is designed to phase-rotate said first signal, but with the opposite sign, and thereby create a fourth signal, the radar system being designed to emit a transmission pulse created by said fourth signal, and the radar system being designed to create a fifth signal from the transmission pulse reflected off targets or objects and received by the radar system;

third phase rotating means designed to phase-rotate said fifth signal by a second phase rotation value and thereby create a sixth signal which is supplied to second signal-processing means designed to process said sixth signal, as a result of which a seventh signal is created; and fourth phase rotating means designed to phase-rotate said seventh signal by the same value as said third phase rotating means is designed to phase-rotate said fifth signal, but with the opposite sign.

11. The device of claim 10, wherein said first and second phase rotation values of said first, second, third and fourth phase rotating means change over time.

12. The device of claim 11, wherein said change of the phase rotation values takes place upon each new transmission pulse.

13. The device of claim 12, further comprising random value generating means for generating new random values as said first and second phase rotation values.

14. The device of claim 12, further comprising calculating means for calculating modified values of said first and second phase rotation values from formulae.

15. The device of claim 12, further comprising phase rotation generating means for looking up in a table, where this table contains a pre-defined pattern, new said first and second phase rotation values.

16. The device of claim 10, wherein the radar system is a Doppler radar system.

17. The device of claim 16, wherein said first and second phase rotation values are identical.

18. The device of claim 17, wherein the radar system is designed to have a high pulse repetition frequency where the time between the emitted pulses is less than the delay time interval of the pulses for conceivable echoes.

* * * * *